US006502475B2

(12) United States Patent
Garcia et al.

(10) Patent No.: US 6,502,475 B2
(45) Date of Patent: Jan. 7, 2003

(54) MULTIPLE-SPEED GEAR ARRANGEMENT FOR PORTABLE PLANER AND OTHER POWER TOOLS

(75) Inventors: Jaime E. Garcia, Jackson, TN (US); Vance E. Roe, Jackson, TN (US)

(73) Assignee: Delta International Machinery Corp., Jackson, MS (US)

( * ) Notice: Subject to any disclaimer, the term of this patent is extended or adjusted under 35 U.S.C. 154(b) by 5 days.

(21) Appl. No.: 09/782,453

(22) Filed: Feb. 13, 2001

(65) Prior Publication Data

US 2002/0108458 A1 Aug. 15, 2002

(51) Int. Cl.[7] .......................... F16H 3/04; F16H 37/06; B26C 1/00

(52) U.S. Cl. .................. 74/332; 74/665 GA; 144/114.1

(58) Field of Search .......................... 144/114.1, 117.1; 74/665 GAA, 665 GE, 332, 333, 413, 421

(56) References Cited

U.S. PATENT DOCUMENTS 2,545,053 A * 3/1951 Siekmann ................. 74/333 X
2,630,846 A * 3/1953 Ballantine ................ 144/114.1
2,792,036 A * 5/1957 Buttke ...................... 144/114.1
3,534,607 A * 10/1970 Selzer et al. .................. 74/332
3,913,642 A * 10/1975 Porter ..................... 144/114.1
4,493,223 A * 1/1985 Kishi et al. ........... 74/421 A X
4,559,846 A * 12/1985 Cochran et al. ....... 74/665 GA
4,710,071 A 12/1987 Koehler et al.
4,964,313 A 10/1990 Davis
5,588,930 A 12/1996 Chen
5,904,192 A * 5/1999 Chen ....................... 144/117.1

FOREIGN PATENT DOCUMENTS

DE 4114818 * 10/1991 ............. 144/114.1
EP 0481595 * 4/1992 ............. 144/114.1

OTHER PUBLICATIONS

Sears/Craftsman 12–1/2" Planer/Molder Owners Manual, Model No. 351.233831, Sears, Roebuck and Co., Nov. 1994.
24" Planer (Model 22–470, Three Phase) Instruction Manual, Delta International Machinery Corp., Part No. 1342457, Jun. 28, 1999.
22–470 24" Planer, P–11, Part No. 1342456, Delta a Pentair Company, Revised Oct. 27, 1999.
15" Planer, 22–675 (1 Phase) & 22–676 (3 Phase), P–9, Part No. 1349384, Delta a Pentair Company, Revised Sep. 2, 1998.
DC–380 15" Planer (Model 22–680, Single Phase) (Model 22–681, Three Phase), Instruction Manual, Delta International Machinery Corp., Part No. 1346996, Sep. 15, 1999.

* cited by examiner

*Primary Examiner*—Charles A. Marmor
*Assistant Examiner*—Roger Pang
(74) *Attorney, Agent, or Firm*—Kirkpatrick & Lockhart LLP

(57) ABSTRACT

A multiple-speed gearbox for a planer. The planer includes a cutterhead mounted on an input shaft, which is driven by an electric motor, and infeed and outfeed rollers, which are driven by an output shaft. The gearbox includes a first input gear rotatable by the input shaft and a first and second output gears mounted on and independently rotatable about the output shaft. The gearbox further includes a three-gear set having a middle gear, a first outer gear and a second outer gear rotatable with a common speed. The middle gear engages the first input gear, the first outer gear engages the first output gear, and the second outer gear engages the second output gear. An actuator is operably attached to the multiple-speed gearbox to selectively engage the output shaft with one of the first and second output gears when the actuator is moved in a first or second axial direction respectively.

13 Claims, 10 Drawing Sheets

MULTIPLE-SPEED GEAR ARRANGEMENT FOR PORTABLE PLANER AND OTHER POWER TOOLS

BACKGROUND OF THE INVENTION

1. Field of the Invention

The invention relates to power tools and, in particular, to a multiple-speed gear arrangement for a planer.

2. Description of the Invention Background

Over the years, in response to consumer demand, thickness planers, i.e. planers for reducing the thickness of a piece of wood or similar materials while providing a smooth and flat finish, have been decreasing in size. Such portable planers balance the need to provide the required power to produce a smooth finish with the need to conserve space and decrease weight for portability.

One planer, such as the model Delta 22-560 planer manufactured by Delta International Machinery Corp. of Jackson, Tenn., has a 15-amp motor and a cutterhead speed of 8000 rpm. This planer is capable of handling stock of up to 12½ inches wide. The feed rate of the workpiece is controlled by the speed of the infeed and outfeed rollers, which is typically, about 26 feet/minute. An electric motor drives the cutterhead by means of a belt and pulley system. The cutterhead provides input to a speed reduction gearbox, and the output speed of the gearbox drives the feed rollers by means of a chain and sprocket arrangement.

It is known that harder materials typically require lower feed rates to enable the cutterhead to produce a smooth finish. Such lower feed rates produce a greater number of cuts per inch, which ultimately results in a smoother surface as compared to faster feed rates, which cause fewer cuts per inch resulting in a rougher surface. Because the overall size of the planer is an important consideration, such planers are equipped with gearing that permits the feed rollers to operate at a single speed. Such gearing arrangements cannot be adjusted to accommodate materials of different hardnesses.

There remains, therefore, a need for a gear arrangement for a planer that overcomes the limitations, shortcomings and disadvantages of other portable planers without compromising their advantages.

SUMMARY OF THE INVENTION

The invention meets the identified needs, as well as other needs, as will be more fully understood following a review of this specification and drawings.

One embodiment of the invention includes a multiple-speed gearbox, preferably for a planer, but also for other power tools. Another embodiment of the invention comprises a planer that includes a cutterhead that is mounted on an input shaft, which is driven by an electric motor. The planer further includes an infeed and an outfeed roller, which are driven by an output shaft.

One embodiment of the gearbox includes a first input gear that is mounted on a first axis and that is rotatable by the input shaft. This embodiment further includes first and second output gears mounted on the output shaft such that they may rotate independently about the output shaft. The gearbox further includes a three-gear set that is rotatable about a second axis that is parallel to the input shaft. The three-gear set has a middle gear, a first outer gear and a second outer gear. The middle gear engages the first input gear, the first outer gear engages the first output gear, and the second outer gear engages the second output gear. The input shaft drives the first input gear through a two-gear set.

An actuator is attached to the output shaft to selectively engage the output shaft with the first output gear to provide a first output speed or with the second output gear to provide a second output speed. The output shaft drives the infeed and outfeed rollers with the first or the second speed, depending upon which outer gear is engaged with the output shaft. The actuator may also have a neutral position.

The described arrangement of the gears makes the gearbox compact, so that it may be supported between two gear plates separated by a distance of about three centimeters. The gearbox may also be used for other power tools, for example a planer/shaper or a molder.

Other features and advantages of the invention will become apparent from the detailed description of the preferred embodiments and from the claims.

BRIEF DESCRIPTION OF THE DRAWINGS

FIG. 1(*b*) is a rear, top and right side isometric view of the driving components of the planer of FIG. 1(*a*);

FIG. 6(*b*) is an end view of the actuator of FIG. 6(*a*);

FIG. 7(*b*) is a cross-sectional view along axis VII(*b*)—VII(*b*) of FIG. 7(*a*);

FIG. 8(*b*) is an end view of the tab of FIG. 8(*a*);

FIG. 9(*b*) is a sectional side view taken along line IX(*b*)—IX(*b*) in FIG. 9(*a*);

FIG. 10(*b*) is a sectional side view taken along line X(*b*)—X(*b*) in FIG. 10(*a*);

DETAILED DESCRIPTION OF THE INVENTION

Figure 1A:
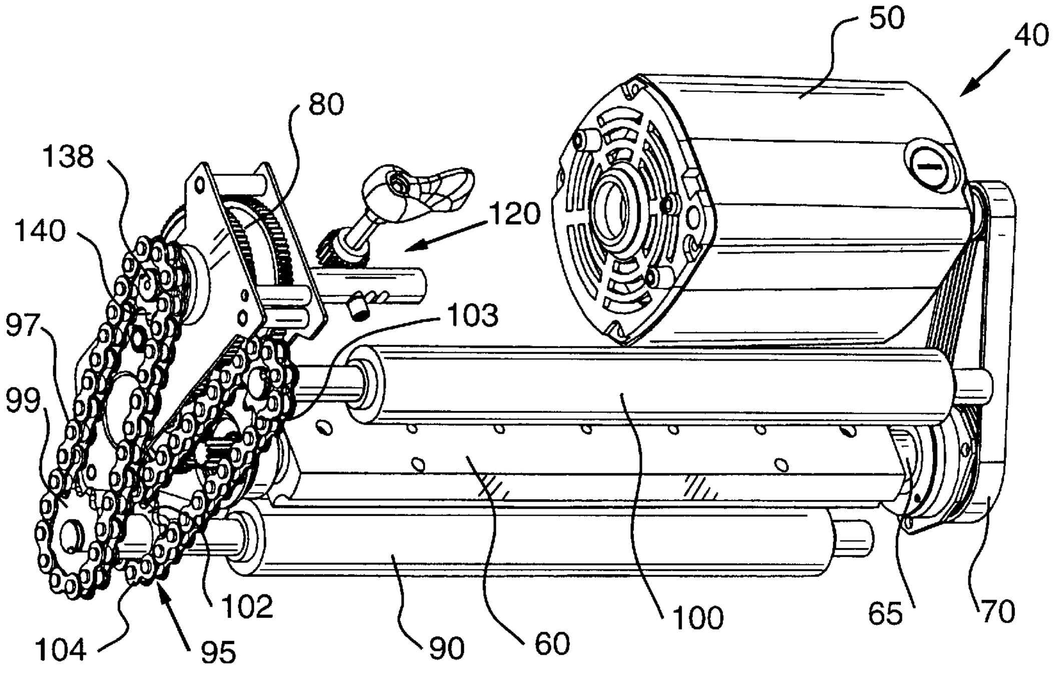
FIG. 1(*a*) is a front, bottom and left side isometric view of the driving components of a planer of the subject invention that also includes an embodiment of a gearbox of the invention.
Figure 1B:
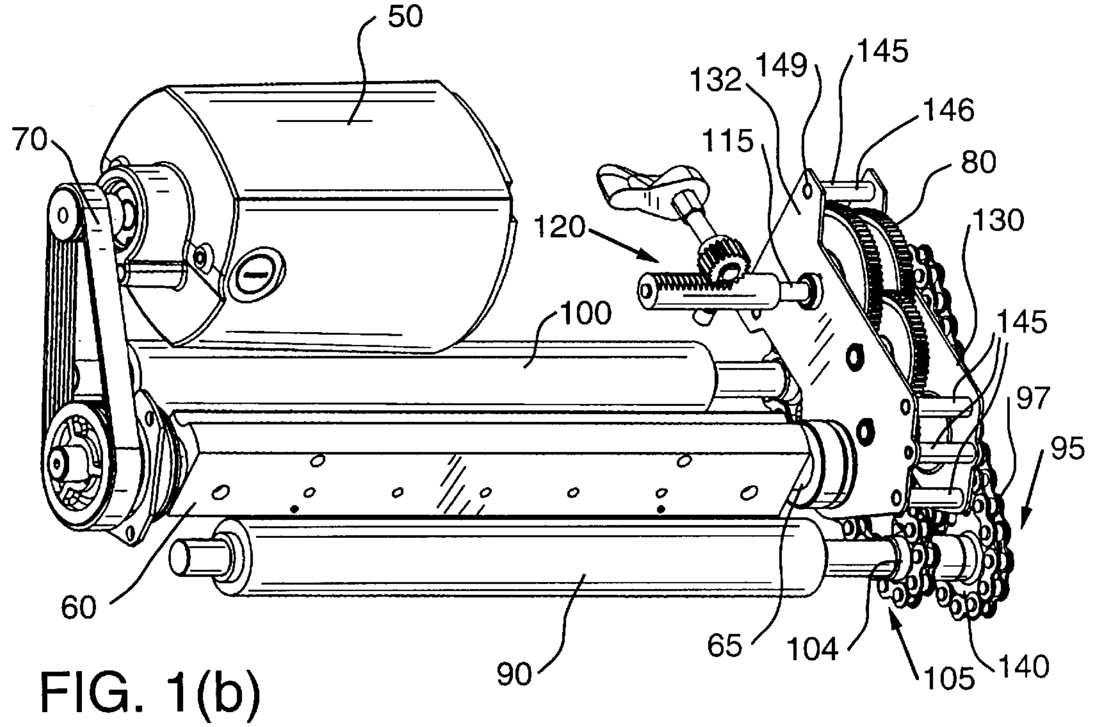
Figure 2:
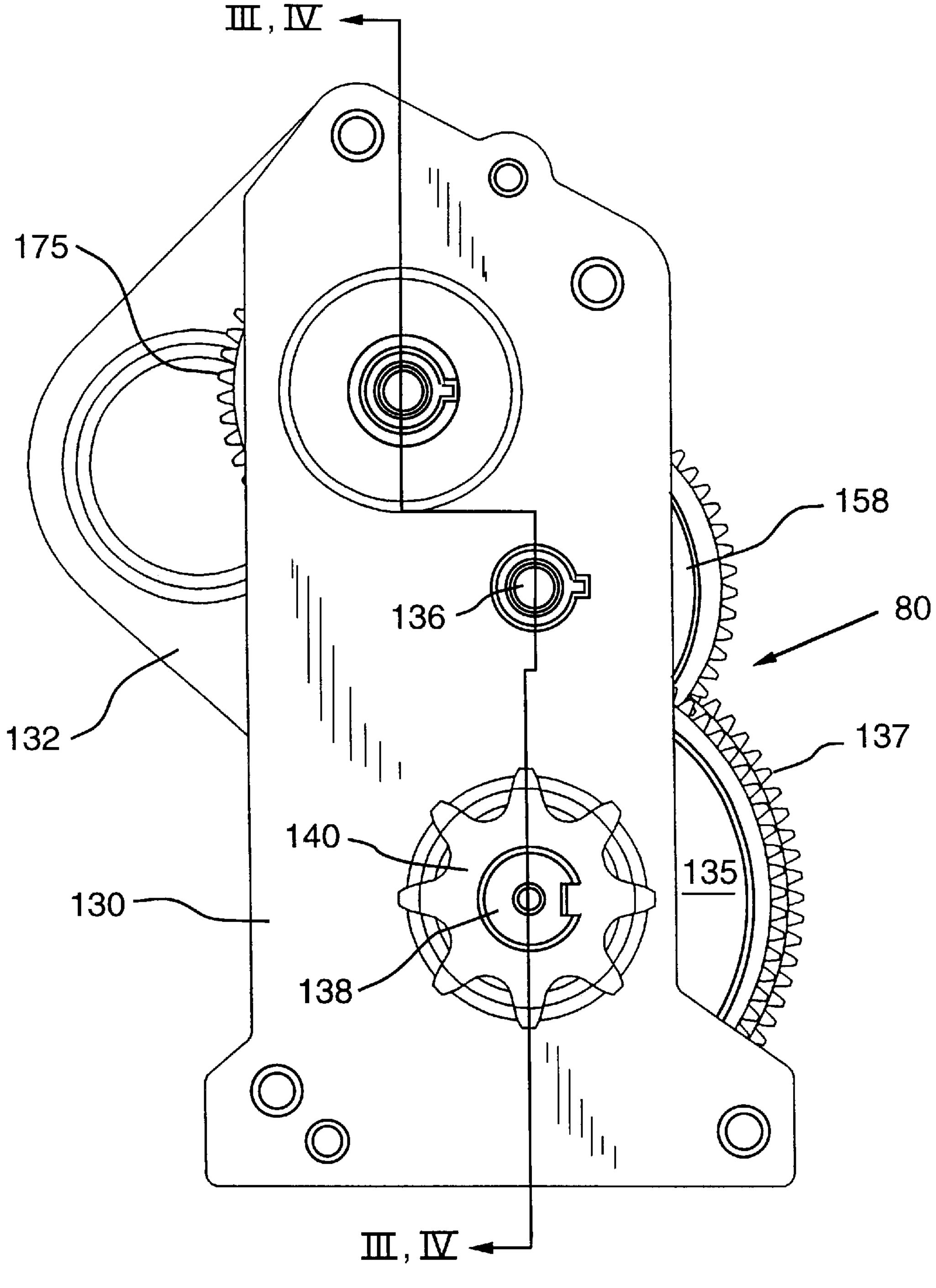
FIG. 2 is a side view of the gearbox employed in the planer driving components depicted in FIG. 1(*a*)

Referring now to the drawings for the purpose of illustrating the invention and not for the purpose of limiting the same, FIGS. 1(*a*) and (*b*) are isometric views of the driving components of a portable planer 40 and their connections according to one embodiment of the invention. A motor 50 drives, by means of belt and pulley system generally designated 70, an input shaft 65 on which a conventional cutterhead 60 is mounted, either as an integral piece, or as a separate component. The input shaft 65 provides input to a multiple-speed gearbox 80. After speed reduction in the gearbox 80, an output speed is transmitted to a first feed roller 90 through a first sprocket and chain system generally designated as 95. In this embodiment, the first feed roller 90 is the outfeed roller. A second sprocket and chain system generally designated as 105 transmits the same output speed from the first feed roller 90 to a second feed roller 100. An actuator 115 operates a tab 165 (shown in FIG. 3) that moves in one of two positions corresponding to a first or second output speed. The tab 165 may also have a neutral position, whereat no output speed is provided. The movement of the tab 165 is controlled by a rack and pinion assembly 120, which is connected to the actuator 115.

In this embodiment, the gearbox 80 is supported between a first plate 130 and a second plate 132, which are separated by a plurality of spacers 145. Each spacer 145 comprises a hollow pin 146 that has a capscrew 147 extending therethrough to be threadedly received in a threaded bore 149 in plate 132. See FIG. 4. A first input gear 170 may be integrally formed with a first shaft stem 178 that is rotatably supported in a bearing sleeve 179 pressed into a hole 133 in the second plate 132 and a second shaft stem 181 that is rotatably supported in a bearing sleeve 185 that is pressed into hole 183 in the first plate 130. See FIG. 3. Shaft stem 178 defines a first axis 148. A second input gear 175 is also keyed on the first shaft stem 178 so that the first input gear 170 and the second input gear 175 rotate with the same speed about the first axis 148. It will be appreciated that other methods of connecting the first input gear 170 and the second input gear 175 are within the purview of the person of ordinary skill in the art. A third input gear (drive gear) 182 is attached to the input shaft 65 and meshingly engages the second input gear 175. The number of teeth of the first input gear 170, the second input gear 175 and the third input gear 182 are $n_1$, $n_2$, $n_3$ respectively. Denoting the speed of the input shaft by $\omega_{is}$, the common speed of the first input gear 170 and the second input gear 175 is $(n_3/n_2)\omega_{is}$.

Figure 5:
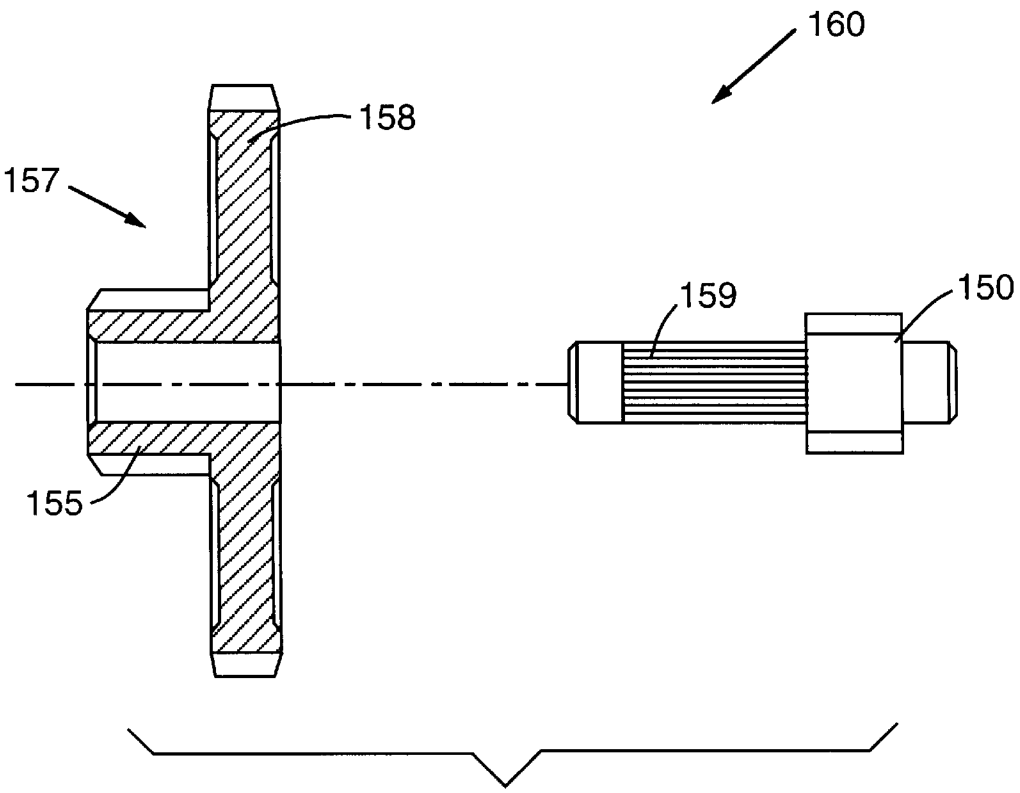
FIG. 5 is an exploded assembly view of the components of an embodiment of a three-gear set with the integral gear assembly 157 shown in cross section.
Figure 6A:
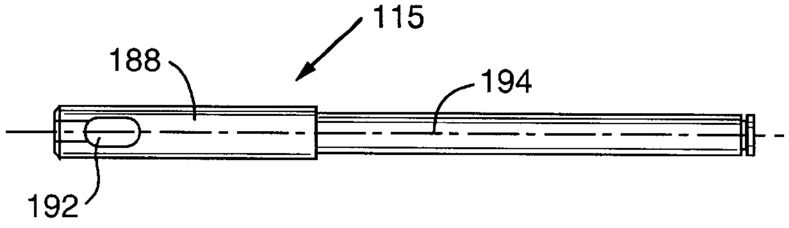
FIG. 6(*a*) is a side view of an embodiment of an actuator of the present invention.
Figure 6B:
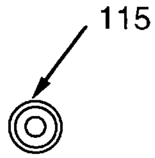
Figure 7A:
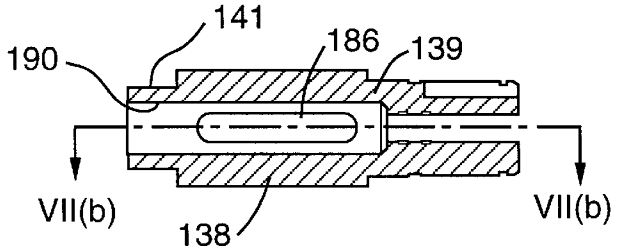
FIG. 7(*a*) is a sectional side view of an embodiment of an output shaft of the present invention.
Figure 7B:
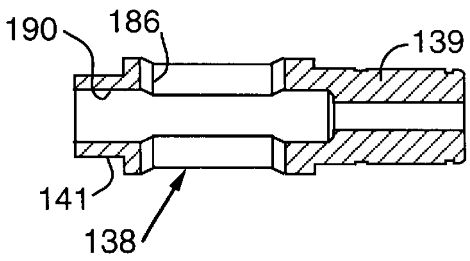
Figure 8A:
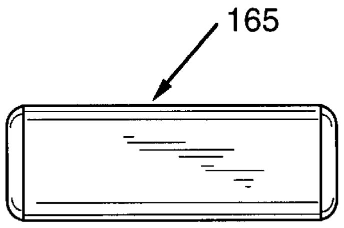
FIG. 8(*a*) is a side view of an embodiment of a tab of the present invention.
Figure 8B:
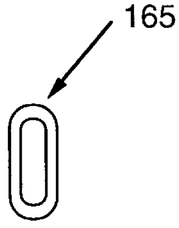

The first input gear 170 engages the middle gear 158 of a three-gear set generally designated as 160. In addition to the middle gear 158, the three-gear set 160 includes a first outer gear 155 and a second outer gear 150. In the embodiment shown in FIGS. 3 and 5, the second outer gear 150 includes a third shaft stem 159. The first outer gear 155 and the middle gear 158 may comprise an integral assembly 157, which is attached to the third shaft stem 159 to form the three-gear set 160. See FIG. 5. This arrangement results in a common rotational speed for all three gears of the three-gear set 160 about a second axis 162, and is one of many arrangements that may be used to achieve the same effect. Denoting by $n_m$ the number of teeth of the middle gear 158 of the three-gear set, the speed of the three-gear set $\omega_{im}$, which is defined as the input speed $\omega_{im}$, is $$\omega_{im}=(n_1/n_m)(n_3/n_2)\omega_{is}$$

Figure 3:
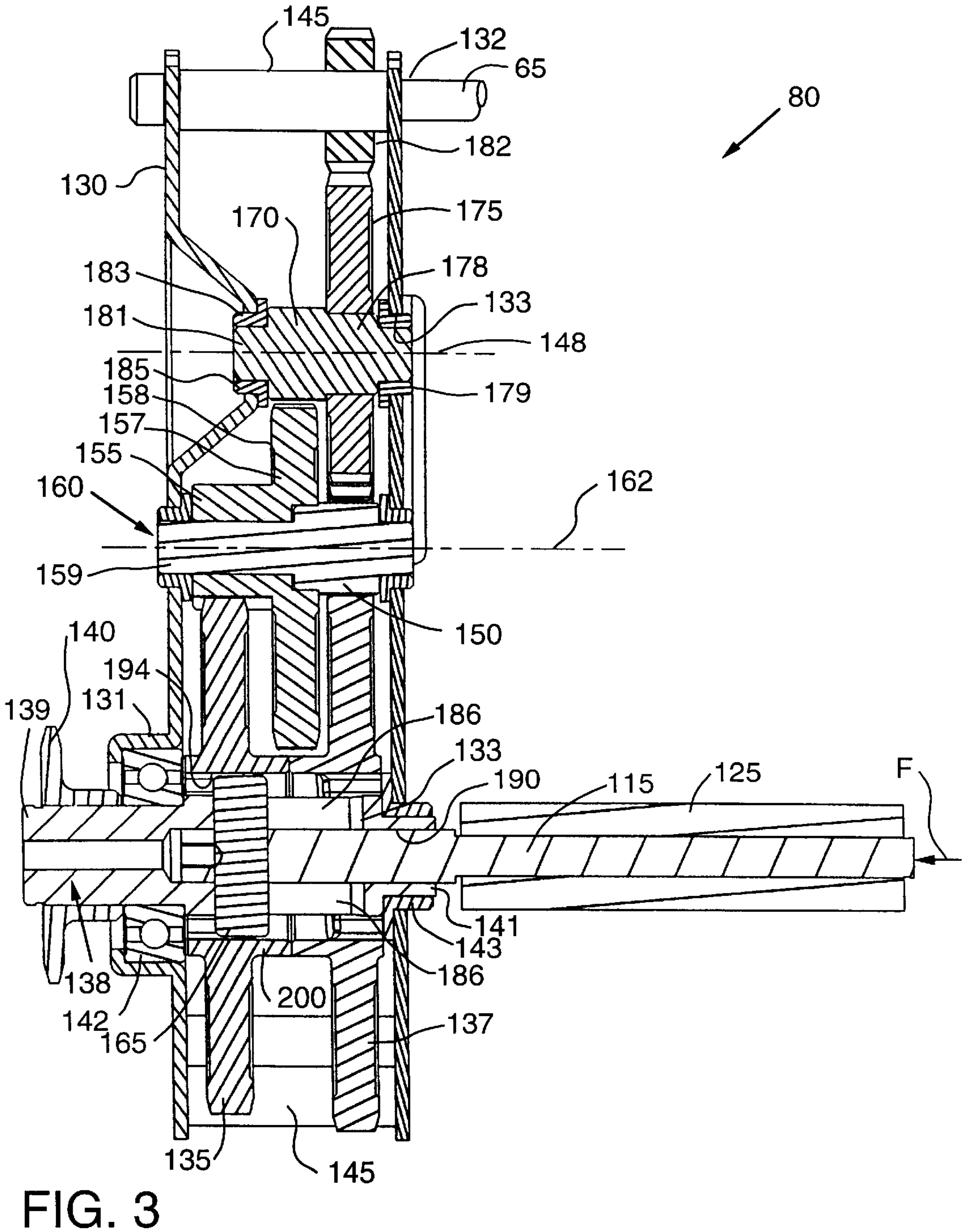
FIG. 3 is a cross-sectional view of the gearbox taken along section III—III of FIG. 2 at a first position of gear engagement.
Figure 4:
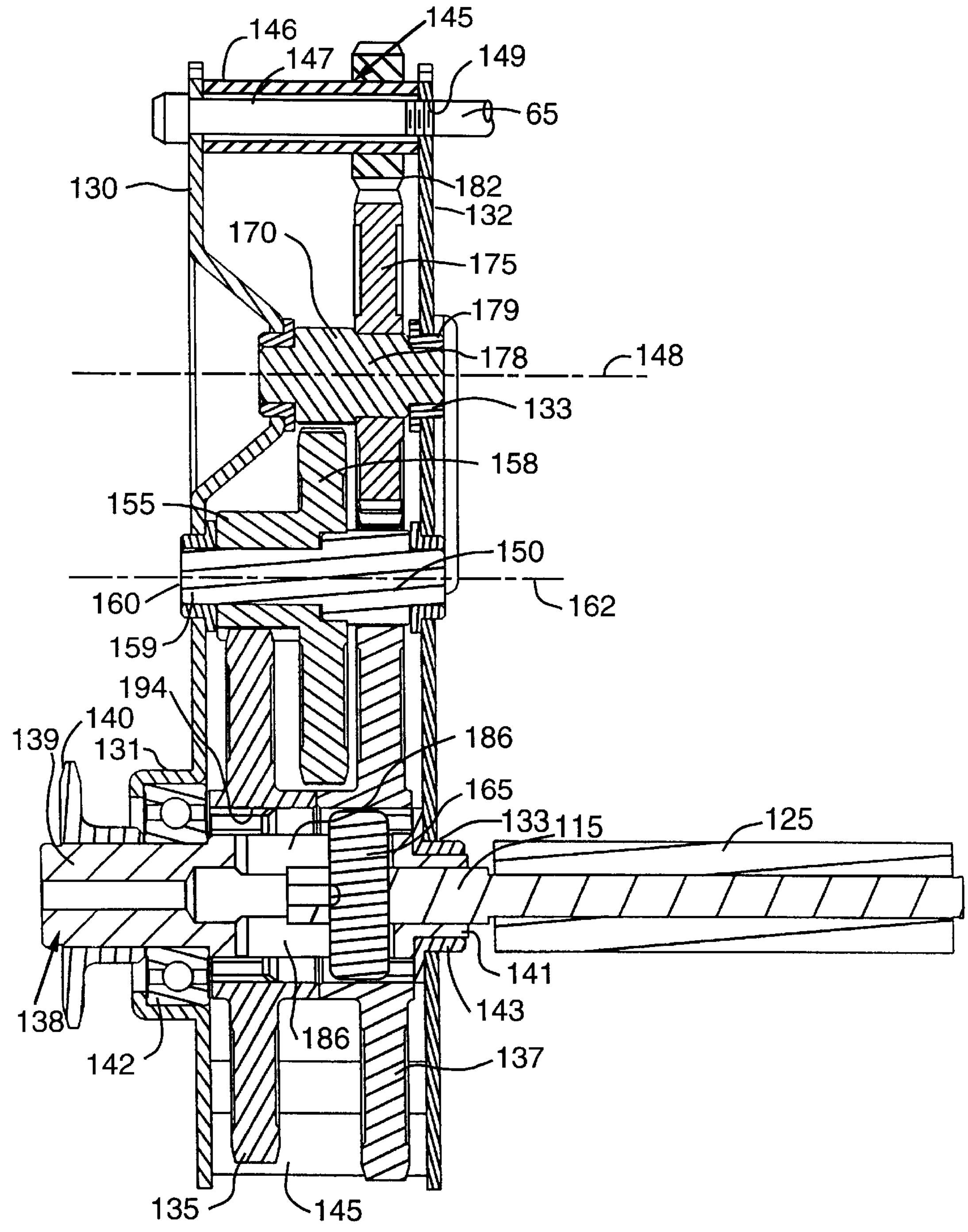
FIG. 4 is a cross-sectional view of the gearbox taken along section IV—IV of FIG. 2 at a second position of gear engagement.

The first outer gear 155 engages a first output gear 135 and the second outer gear 150 engages a second output gear 137 so that when the input shaft 65 rotates with a speed $\omega_{is}$, the first output gear 135 rotates with a speed $\omega_{o1}$ and the second output gear 137 rotates with speed $\omega_{o2}$:

$$\omega_{o1}=(n_{1m}/n_{o1})\omega_{im}=(n_{1m}/n_{o1})(n_1/n_m)(n_3/n_2)\omega_{is},$$

$$\omega_{o2}=(n_{2m}/n_{o2})\omega_{im}=(n_{2m}/n_{o2})(n_1/n_m)(n_3/n_2)\omega_{is},$$

where $n_{1m}$ is the number of teeth of the first outer gear 155, $n_{2m}$ is the number of teeth of the second outer gear 150, $n_{o1}$ is the number of teeth of the first output gear 135, and $n_{o2}$ is the number of teeth of the second output gear 137. A kinematic requirement for gear engagement is satisfied when the number of teeth is chosen to satisfy the following equation:

$$n_{o1}+n_{1m}=n_{o2}+n_{2m},$$

i.e. the sum of the number of teeth of the first outer gear and the first output gear is equal to the sum of the number of teeth of the second outer gear and the second output gear. The first output gear 135 and the second output gear 137 are mounted on an output shaft 138 so that they may rotate independently about the output shaft 138. The output shaft 138 may rotate with a first speed equal to $\omega_{o1}$ when it is engaged with the first output gear 135, as shown in FIG. 3, and with a second speed equal to $\omega_{o2}$ when it is engaged with the second output gear 137, as shown in FIG. 4. The output shaft 138 has a first shaft portion 139 upon which an output sprocket 140 may be keyed. The first shaft portion 139 is rotatably supported by a conventional bearing 142 that is pressed into a boss 131 formed in the first plate 130. The output shaft 138 further has a second shaft portion 141 that is rotatably supported in a flanged bearing 143 that is pressed into hole 133 in the second plate 132.

The selective engagement of the output shaft 138 with the first output gear 135 or the second output gear 137 is accomplished by a gear shifting mechanism, which includes an actuator 115 and a tab 165, as shown in FIGS. 3, 4 and 6–8. A first end 188 of the actuator 115 is slidably inserted into a cylindrical bore 190 coaxially provided in the output shaft 138. The actuator 115 is slidably restrained in the bore 190 by the tab 165, which is fitted through an opening 192 in the first end 188 of the actuator 115 so that the tab 165 forms a right angle with the axis 194 of the actuator 115. See FIG. 6(*a*). The tab 165 passes through and extends transversely outward from two diametrically opposed longitudinal slots 186 in the output shaft 138, the slots 186 being aligned with the opening 192 of the first end 188 of the actuator 115. See FIGS. 3 and 4.

Figure 9B:
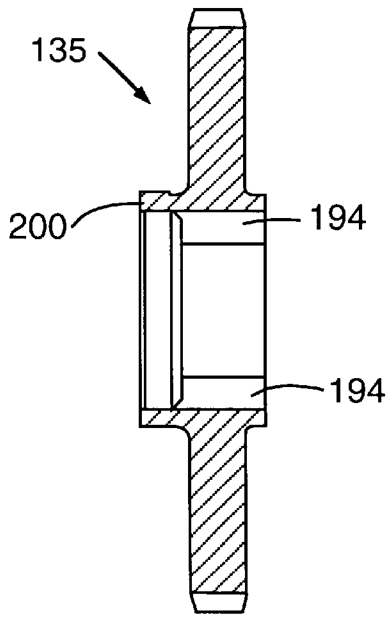
FIG. 9(*a*) is a front view of an embodiment of a first output gear of the present invention.
Figure 9A:
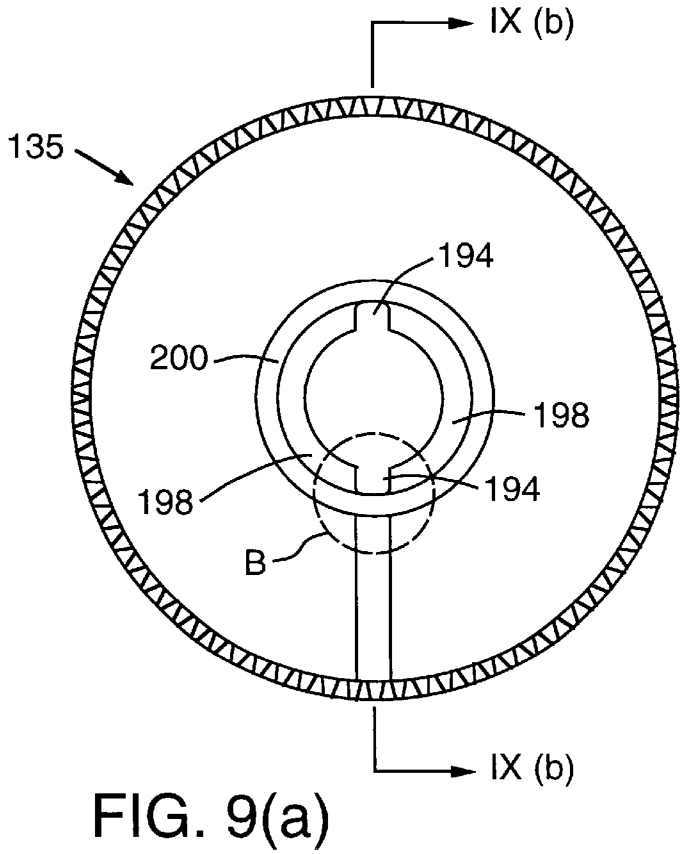
Figure 11:
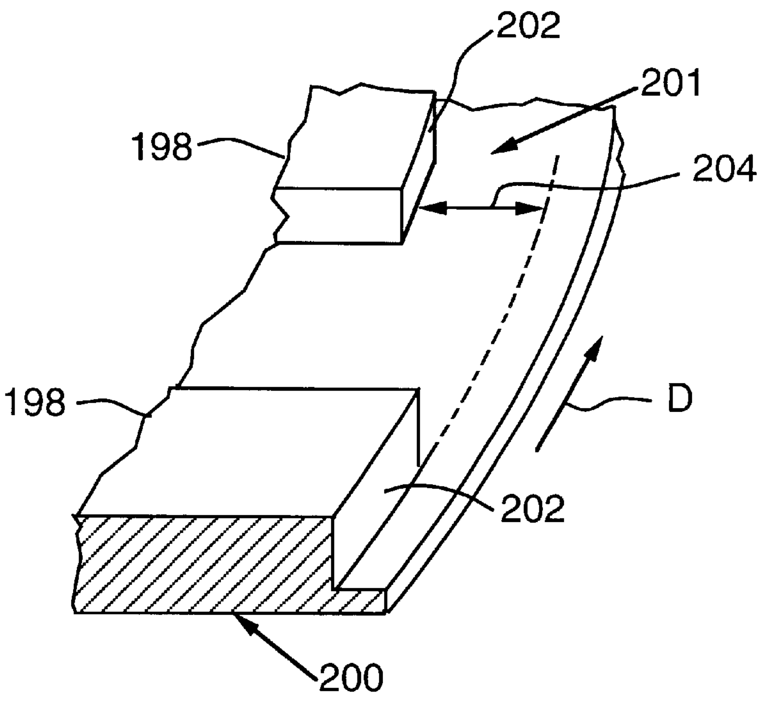
FIG. 11 is a partial perspective view of detail B of FIG. 9(*a*)

The tab 165 may fit into a diametrical slot 194 formed in the hub 200 of the first output gear 135 by two semi-cylindrical first segments 198, as shown in FIGS. 9(*a*) and (*b*). The top surface 202 of each of the semi-cylindrical first segments 198, forms a first spiral ramp generally designated as 201, so that moving in a counterclockwise direction along the top surface 202 from one segment to the other (represented by arrow "D" in FIG. 11), there is a ramp-down step 204 (a step in a direction away from the second output gear and toward the first output gear), as shown exaggeratingly in FIG. 11, which is a perspective view of detail B of FIG. 9(*b*).

Figure 10B:
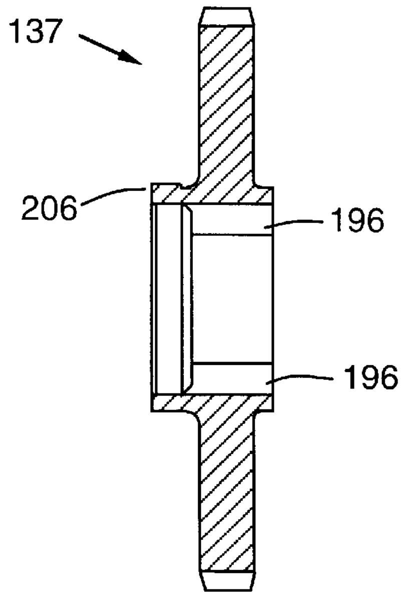
FIG. 10(*a*) is a front view of an embodiment of a second output gear.
Figure 10A:
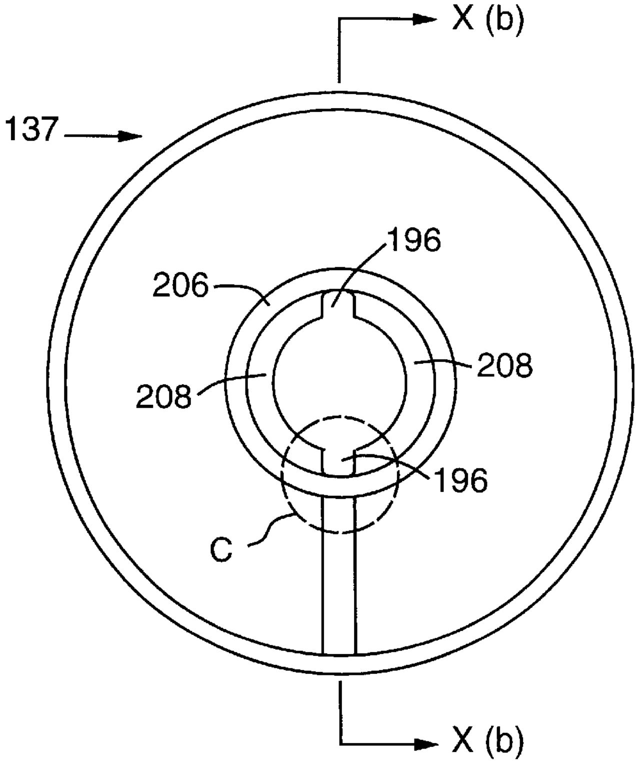
Figure 12:
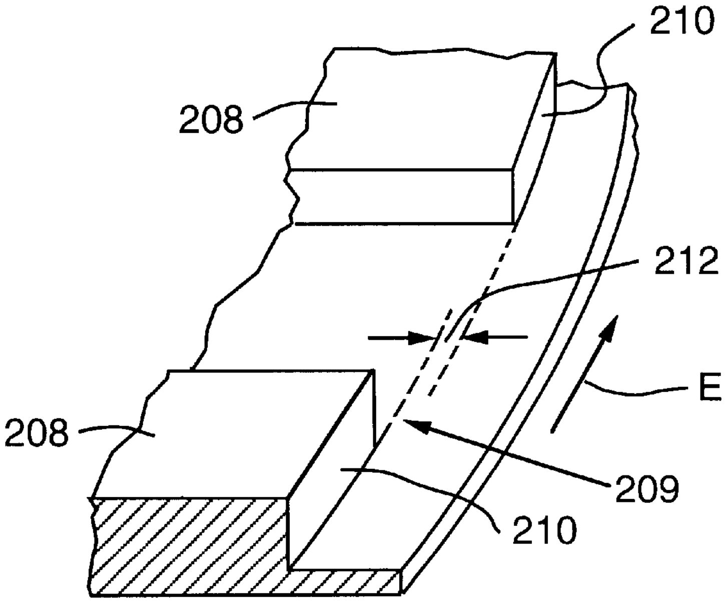
FIG. 12 is a partial perspective view of detail C of FIG. 10(*a*)
Figure 13:
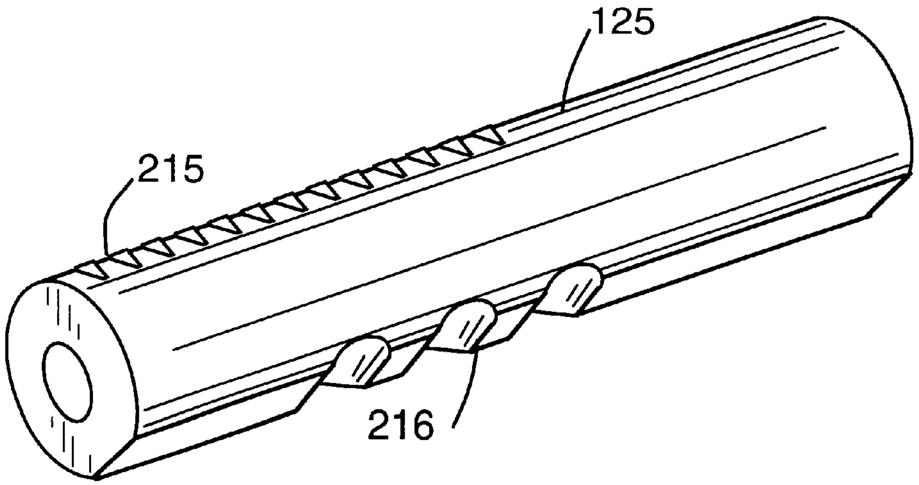
FIG. 13 is a perspective view of an embodiment of a rack of the present invention.
Figure 14:
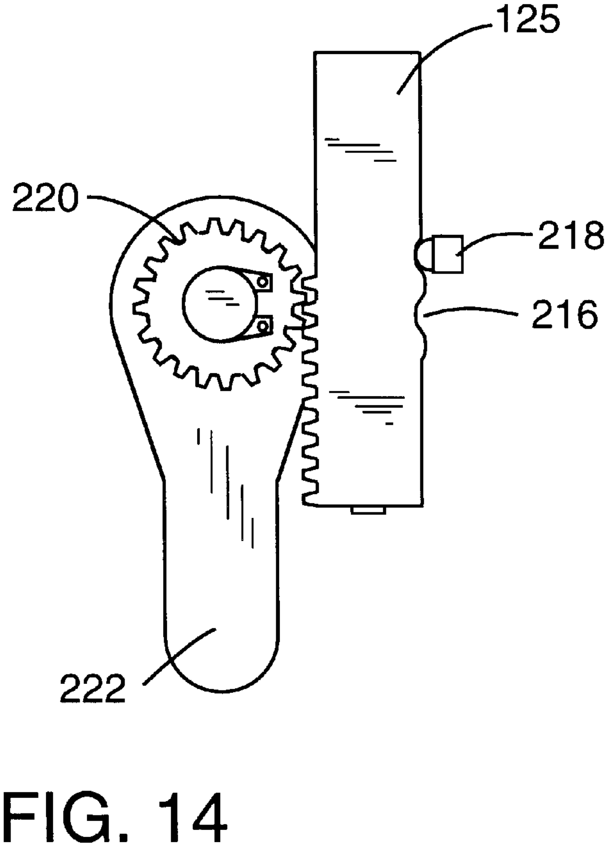
FIG. 14 is a side view of an embodiment of a rack-and pinion assembly of the present invention.

The tab 165 may similarly fit into a diametrical slot 196 formed in the hub 206 of the second output gear 137 by two semi-cylindrical segments 208, as shown in FIGS. 10(*a*) and (*b*). The top surface 210 of each semi-cylindrical segments 208, forms a second spiral ramp generally designated 209, so that moving in a counterclockwise direction along the top surface 210 from one segment to the other (represented by arrow "E" in FIG. 12), there is a ramp-up step 212 (a step in a direction away from the first output gear and toward the second output gear), as shown exaggeratingly in FIG. 12, which is a perspective view of detail C in FIG. 10(*b*).

The spiral ramps 201 and 209 in the hubs 200 and 210, respectively, of the first and second output gears 135, 137, facilitate the engagement of the tab 165 with the respective slots 194 and 196 by virtue of the axial actuation of the actuator 115. For example, when the actuator 115 is axially moved in a first direction represented by arrow "F" in FIG. 3 the tab 165 contacts the first spiral ramp 201. Further axial movement of the actuator shaft in the "F" direction causes the actuator to also rotate in the same direction as the first output gear 135 until tab 165 slides into the slot 194 in the first output gear 135 thereby non-rotatably affixing the first output gear 135 to the output shaft 138 so that the output shaft rotates 138 rotates with the first speed $\omega_{o1}$. Thus, when the actuator shaft is moved a predetermined distance, which may be about 8–10 mm in this embodiment, in the first axial direction, the first output gear is non-rotatably affixed to the output shaft 138. When in this position, as shown in FIG. 3, those of ordinary skill in the art will appreciate that rotating of the first output gear 135 imparts rotary motion to the output shaft 138 and output sprocket 140 which is attached thereto. Similarly, when the actuator 115 is moved in a second axial direction, the tab 165 contacts the second ramp 209 in the hub 206 of the second output gear 137 (typically passing through a neutral position, i.e. a position of no engagement), the spiral ramp formed by the top surface 210 of the segments 208 of the second output gear 137 guides the tab 165 into the slot 196 of the second output gear 137 to a second position of engagement, so that the output shaft 138 rotates with the second speed $\omega_{o2}$. Thus, when in the actuator shaft is moved a predetermined distance, which may be about 8–10 mm in this embodiment, in the second axial direction, the second output gear 137 is non-rotatably affixed to the output shaft 138. It will be appreciated that other methods of shifting between the first and second output gears could be employed without departing from the spirit and scope of the present invention.

As seen from FIGS. 3 and 4 the arrangement of the various gears is such that the gearbox 80 is compact in size with all the gears confined between the first and second gear plates 130 and 132. For example in one embodiment wherein a 15 Amp motor is employed to rotate the cutterhead at 8000 rpm and the feeding rate is about 15 ft/min at low speed and about 23 ft/min at high speed, the gear plates are about three centimeters apart. As can be seen in FIGS. 1(*a*), 1(*b*), 3 and 4, an output sprocket 140 is keyed onto output shaft 138. A first drive chain 97 is received on the output sprocket 140 and on a first sprocket 99 that is keyed on to the shaft of the first feed roller 90. The output sprocket 140, the first drive chain 97 and the first sprocket 99 form the first sprocket and chain system 95. A second sprocket and chain system 105 includes an second sprocket 102 keyed onto the shaft of the first feed roller 90, a third sprocket 103 keyed onto the shaft of the second feed roller 100 and a second drive chain 104 received on the second and third sprockets 102 and 103. See FIG. 1(*a*).

The gears of the gearbox may be molded from a plastic material, which as will be appreciated can provide advantages of sound and weight reduction, or, alternatively, may be custom-made from powdered metal or cut metal, for superior strength and wear.

In one embodiment of the gearbox 80 that may be advantageously used in the power train of 13" portable planer, the speed reduction ratio in the gearbox is:

$$\omega_{o1}/\omega_{is}=(n_{1m}/n_{o1})(n_1/n_m)(n_3/n_2)=(17/75)(12/58)(12/52)\cong 0.01$$

for the first (high speed) and $$\omega_{o2}/\omega_{is}=(n_{2m}/n_{o2})(n_1/n_m)(n_3/n_2)=(12/80)(12/58)(12/52)\cong 0.007$$

for the second (low) speed. For an input shaft speed, $\omega_{is}$, of 8000 rpm, for example, the first output speed is about 80 rpm and the second output speed is about 56 rpm. With ordinary materials and applications the output shaft would operate at the higher first speed, which is 80 rpm in this example. When the workpiece is made of harder wood, such as, for example, maple or hickory, or when a better finish is desirable the output shaft speed is shifted down to the second (low) speed, which is 56 rpm in this example. In this example, the speed of the output shaft may be reduced by approximately 30%. It will be appreciated that additional speed reduction from the output shaft to the first feed roller may be provided by using sprockets of unequal size in the first sprocket and chain system 96, which transmits rotational motion from the output shaft 138 to the first feed roller 90. The additional reduction may be, for example, at a ratio of 8:11.

The actuator 115 may be manually operated using a handle 222 connected to a rack-and-pinion assembly 120, as shown in FIGS. 1(*a*), 1(*b*), 13 and 14. The rack 125 is a cylindrical sleeve that is riding on the actuator 115 and prevented from sliding off by a screw or retaining ring at one end. On one side of the surface of the rack 125 there is a series of rack teeth 214 for engaging the teeth of a pinion 220. On another side on the surface of the rack 125, three grooves 216 may be provided, each groove corresponding to one of the three positions of the actuator 115, i.e. the first position of engagement, the second position of engagement and the neutral position. A spring-biased plunger 218 may be used to secure the position of the actuator 115 from accidental disengagement. A handle 222 is attached to the pinion 220 and is used to advance the rack 125 and the actuator 115, and the plunger 218 locks the actuator in the desired position. It may be appreciated that other means of controlling and locking the motion of the actuator are within the purview of the person of ordinary skill in the art.

The multiple-speed gearbox 80 has been described in connection with a portable planer, but it can be readily used with a combination planer/shaper, planer/molder, planer/sander, or with any other portable power tool in which a multiple-speed output is desirable. In such a power tool, the input shaft is generally driven by a motor and the output shaft drives a tool holder, which is specific to the particular power tool.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A planer including a rotatable cutterhead with an input shaft, a motor drivingly coupled to the cutterhead, and at least one feed roller, the planer comprising:

a multi-speed gear assembly drivingly engaged with the motor and the at least one feed roller, wherein the a multi-speed gear assembly comprises:

a drive gear attached to the input shaft;

first and second input gears mounted on a common rotatable shaft, the second input gear in meshing engagement with the drive gear;

a three-gear set rotatable as a unit, the three-gear set including a middle gear in meshing engagement with the first input gear, and a first outer gear and a second outer gear; and first and second output gears mounted on an output shaft and being independently rotatable about the output shaft, the first output gear in meshing engagement with the first outer gear and the second output gear meshing engagement with the second outer gear; and an actuator operably attached to the multi-speed gear assembly and constructed to selectively cause the multi-speed gear assembly to transmit a first rotational speed from the motor to the at least one feed roller when the actuator is moved in a first axial direction and to selectively cause the multi-speed gear assembly to transmit a second rotational speed from the motor to the at least one feed roller when the actuator is moved in a second axial direction, wherein the actuator is operably coupled to the output shaft to selectively engage one of the first and second output gears to the output shaft.

2. The planer of claim 1 wherein the at least one feed roller comprises two feed rollers operably connected to rotate at the same speed.

3. The planer of claim 1, wherein the at least one feed roller comprises first and second feed rollers and wherein the output shaft has an output sprocket mounted thereon and wherein the first feed roller has a first sprocket thereon and wherein a first drive chain is received on the output sprocket and the first sprocket.

4. The planer of claim 3, wherein the first feed roller has a second sprocket mounted thereon and the second feed roller has a third sprocket mounted thereon and wherein a second drive chain is received in the second and third sprockets.

5. The planer of claim 1, wherein the actuator is axially movable relative to the output shaft and constructed to non-movably couple the first output gear with the output shaft when the actuator is moved in a first axial direction and selectively de-couple the first output gear from the output shaft and non-movably couple the second output gear to the output shaft when the actuator is moved in a second axial direction.

6. The planer of claim 5, wherein the actuator comprises:

an actuator shaft slidably received in an axial bore in the output shaft; and a tab attached to the actuator shaft transverse to the output shaft and slidably received in axial slots in the output shaft such that a corresponding portion of the tab protrudes out of each axial slot in the output shaft and is slidably movable therein in the first and second axial directions.

7. The planer of claim 6, wherein the first output gear further comprises:

a first output gear hub; and a first diametrical slot in the first output gear hub sized to selectively receive the corresponding portions of the tab that protrude from the axial slots in the output shaft.

8. The planer of claim 6, wherein the second output gear further comprises:

a second output gear hub; and a second diametrical slot in the second output gear hub and sized to selectively receive therein the corresponding portions of the tab that protrude from the axial slots in the output shaft.

9. The planer of claim 7, wherein the first diametrical slot in the first output gear hub is defined by two semi-cylindrical first segments in the first output gear hub, each of the first segments having a first top surface, the first top surfaces defining a first ramp surface such that a first ramp step is defined between the first segments.

10. The planer of claim 8, wherein the second diametrical slot in the second output gear hub is defined by two semi-cylindrical second segments in the second output gear hub, each of the second segments having a second top surface, the second top surfaces defining a second ramp surface such that a second ramp step is defined between the second segments.

11. The planer of claim 6, wherein the actuator further comprises:

a rack having a series of teeth therein attached to the actuator shaft;

a pinion gear rotatably supported relative to the rack, the pinion gear having teeth intermeshed with the teeth on the rack; and a handle attached to the pinion gear.

12. The planer of claim 11, further comprising a plunger engageable to a plurality of grooves on the rack to secure the axial position of the actuator shaft.

13. The planer of claim 12, wherein the plurality of grooves comprise:

a first groove in the rack corresponding to a first axial position wherein the first output gear is engaged with the output shaft;

a second groove in the rack corresponding to a neutral position of the actuator shaft wherein the first output gear and the second output gear are rotatable about the output shaft; and a third groove in the rack corresponding to a second axial position wherein the second output gear is engaged with the output shaft.

* * * * *

UNITED STATES PATENT AND TRADEMARK OFFICE

CERTIFICATE OF CORRECTION

PATENT NO. : 6,502,475 B2 
DATED : January 7, 2003
INVENTOR(S) : Garcia et al.

It is certified that error appears in the above-identified patent and that said Letters Patent is hereby corrected as shown below:

Title page,
Item [73], Assignee, delete state code designation "MS" and insert -- TN -- therefor.

Signed and Sealed this

Twenty-fourth Day of June, 2003

JAMES E. ROGAN
*Director of the United States Patent and Trademark Office*